Aug. 5, 1941.　　　G. R. PFLASTERER　　　2,251,575
APPARATUS FOR RAILWAY TRAIN COMMUNICATION SYSTEMS
Filed Jan. 18, 1940
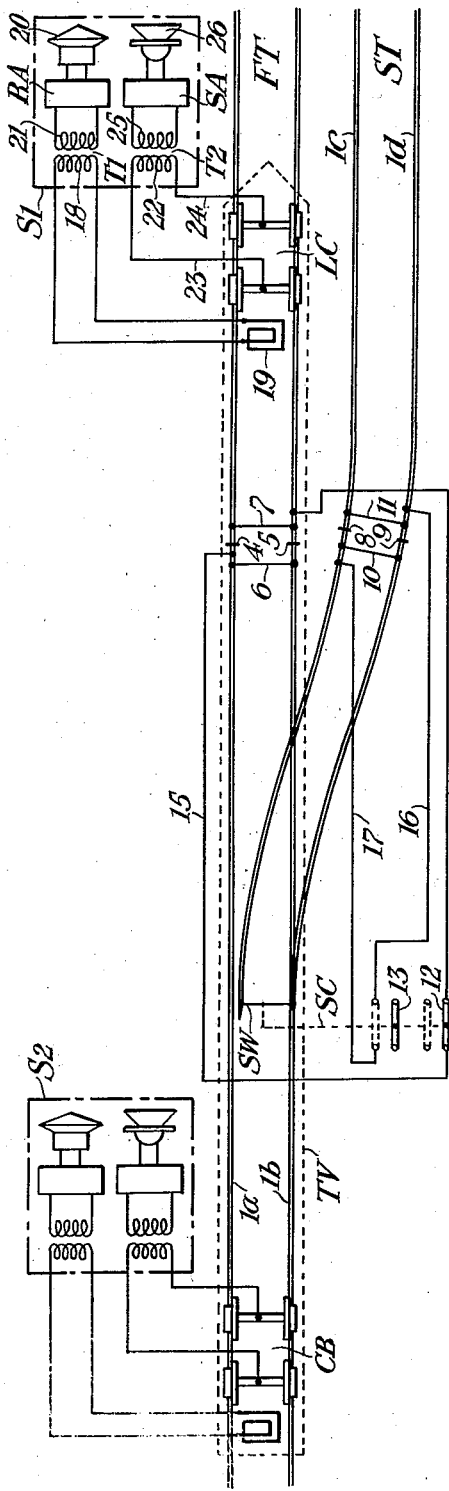
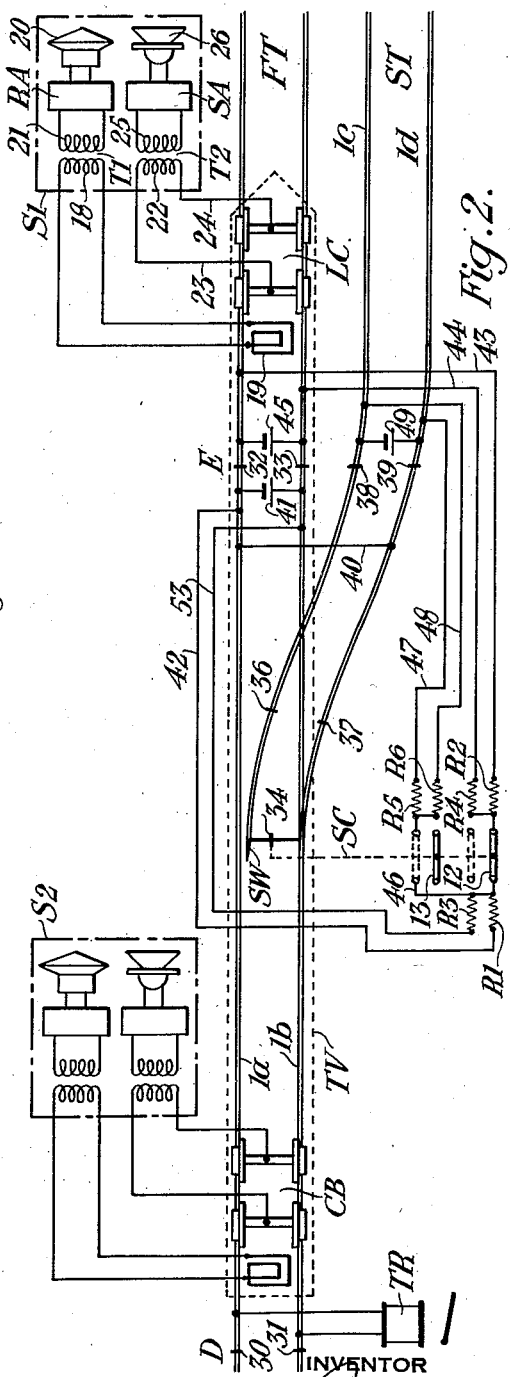
INVENTOR
George R. Pflasterer.
BY
HIS ATTORNEY Patented Aug. 5, 1941

2,251,575

UNITED STATES PATENT OFFICE 2,251,575

APPARATUS FOR RAILWAY TRAIN COMMUNICATION SYSTEMS

George R. Pflasterer, Greenville, Pa., assignor to The Union Switch and Signal Company, Swissvale, Pa., a corporation of Pennsylvania Application January 18, 1940, Serial No. 314,471

3 Claims. (Cl. 246—8)

My invention relates to apparatus for railway train communication systems, and more particularly to apparatus for railway train communication systems which use the track rails as a part of the transmitting circuit.

Railway train communication systems for telephone communication between a station located on a vehicle of a train, such as a locomotive of a freight train, and another station remote therefrom, such as a station located in the caboose of the freight train, are in use. Telephone current is applied to the track rails at the sending location either inductively through the medium of an inductor mounted in inductive relation with the rails or conductively through the medium of a circuit connected with the rails. The current flows in the rails in both directions from the point at which it is applied and returns through the ground and other conductors. At the receiving station current is preferably received from the track rails inductively through the medium of an inductor mounted in inductive relation with the rails. At a track switch connecting two diverging tracks, such communication current may divide between the rails of the two possible routes. That portion of the communication current that flows in the rails of the track opposite that set up by the position of the track switch may serve little or no useful purpose and hence may be a leakage current.

Accordingly, a feature of my invention is the provision of novel and improved means for such train communication systems for routing the communication current to the track rails corresponding to the route set up for the train, so that unnecessary division of the current is avoided. This feature, as well as other advantages of my invention, I effect by locating insulated rail joints at selected points in the track rails of each route leading from a track switch to block the flow of communication current and then by-passing the current around the insulated rail joints in the track of the route set up by the track switch by a circuit network controlled according to the position of the track switch, such circuit network being effective to by-pass the communication current around the insulated joints with little or no attenuation and to effectively block track circuit current used for signaling.

I shall describe two forms of apparatus embodying my invention and shall then point out the novel features thereof in claims.

In the accompanying drawing, Fig. 1 is a diagrammatic view showing one form of apparatus embodying my invention when used at a track switch in a non-track circuited territory, and Fig. 2 is a diagrammatic view showing a preferred form of apparatus embodying my invention when used at a track switch in a territory provided with track circuits.

In each of the different views like reference characters designate similar parts.

Referring to Fig. 1, the reference characters $1a$ and $1b$ designate the track rails of a first or main track FT of a stretch of railway which includes a track switch SW of a turnout leading to a second track ST of which second track are designated by the reference characters $1c$ and $1d$. In accordance with standard practice, the track switch SW when set at its normal position, that is, the position shown in Fig. 1, establishes the route for trains on the main track. In other words, when the track switch SW is set at its normal position a train will pass from the left-hand portion of the track FT to the right-hand portion or vice versa. When the track switch is set at its reverse position, that is, the position opposite that shown in Fig. 1, a route for trains to pass from track FT to track ST or vice versa is established. As stated hereinbefore, the tracks FT and ST of Fig. 1 are not provided with track circuited sections for signaling. However, the track rails of each of the two tracks FT and ST of Fig. 1 may be bonded in any one of the well-known ways to form the rails into continuous electrical conductors as an aid in transmitting the communication current. Such bonding of the track rails may not be needed, the fastenings of the rail joints serving to electrically join the adjacent rails. A pair of insulated rail joints 4 and 5 is placed in the track FT at a selected point preferably in the vicinity of the frog of the turnout, rail joint 4 being placed in rail $1a$ and rail joint 5 being placed in rail $1b$. Preferably a cross bond 6 electrically connects the rails $1a$ and $1b$ together at the left-hand side of the insulated rail joints 4 and 5 and a cross bond 7 connects the rails together at the right-hand side of the insulated rail joints. In a similar manner a pair of insulated rail joints 8 and 9 is placed in track ST at a selected point, preferably in the vicinity of the frog of the turnout, rail joint 8 being placed in rail $1c$ and rail joint 9 being placed in rail $1d$. Also, two cross bonds 10 and 11 are preferably connected across the rails $1c$ and $1d$ on opposite sides respectively of the insulated rail joints 8 and 9.

A switch circuit controller SC is operatively connected with the track switch SW as indicated by a dotted line for operation of two circuit controlling contacts 12 and 13, the arrangement being such that contacts 12 and 13 occupy the positions indicated by the solid lines when the switch SW is set at its normal position and are moved upward as viewed in the drawing to the dotted line positions when the switch is set at its reverse position. The contact 12 is included in a circuit for bridging the insulated rail joints 4 and 5, such circuit comprising wire 14 connected to rail 1b to the right of insulated rail joint 5, contact 12 closed at the normal position of switch SW, and wire 15 connected to rail 1a to the left of insulated rail joint 4. Since cross bonds 6 and 7 electrically connect the rails 1a and 1b together it is clear that this circuit, including contact 12, bridges around both insulated rail joints 4 and 5. The contact 13 is included in a circuit for bridging the insulated rail joints 8 and 9, the circuit comprising wire 16 connected to rail 1d to the right of the insulated rail joint 9, contact 13 closed when the switch SW is set at its reverse position and wire 17 connected to rail 1c to the left of the insulated rail joint 8. Since the cross bonds 10 and 11 electrically connect the rails 1c and 1d together it is clear that this circuit, including contact 13, bridges around both insulated rail joints 8 and 9 when the switch SW is set at its reverse position.

It follows that when track switch SW is set at its normal position to establish the route on the main track FT, insulated rail joints 4 and 5 are bridged by the associated circuit and communication current is by-passed around the joints with little attenuation, and the insulated rail joints 8 and 9 are effective to block the flow of communication current in the track ST. When track switch SW is set at its reverse position to establish the route to track ST, insulated rail joints 8 and 9 are bridged by the associated circuit to by-pass the communication current around such insulated joints, while the insulated joints 4 and 5 are effective to block the flow of communication current in the track FT.

In Fig. 1 a train shown conventionally at TV includes a locomotive indicated at LC and a caboose indicated at CB. Telephone stations S1 and S2 are located on the locomotive LC and in the caboose CB, respectively. Each station S1 and S2 is provided with transmitting and receiving telephone apparatus of any one of the several well-known forms and such apparatus will be described in the present application only insofar as is necessary to fully understand the present invention. The apparatuses at the two stations S1 and S2 are preferably alike and hence a description of one will serve for an understanding of both.

Looking at station S1, the input winding 18 of a transformer T1 is connected with an inductor 19 mounted on the locomotive in the well-known manner in inductive relation with the track rails. The output winding 21 of transformer T1 is connected with the input terminals of a receiving amplifier RA to whose output terminals a telephone receiver or loud speaker 20 is connected. The receiving amplifier RA is shown conventionally since its specific structure forms no part of my present invention and it may be any one of the several well-known forms for such amplifier. The output winding 22 of a transformer T2 is conductively coupled with the track rails over wires 23 and 24 due to these wires being connected with different axles of the locomotive in any of the several well-known ways. The input winding 25 of transformer T2 is connected with the output terminals of a sending amplifier SA to whose input terminals a microphone 26 is connected. The amplifier SA may be similar to the amplifier RA. It is clear that voice frequencies produced by speaking into the microphone 26 are amplified at the amplifier SA and are applied to the rails adjacent the locomotive, from which point the telephone current flows in the rails in multiple in both directions in the well-known manner, a portion of the telephone current reaching the remote station S2. When telephone current is applied in a similar manner to the rails at the remote station and a portion flows in the rails adjacent the locomotive LC such telephone current induces corresponding electromotive forces in the inductor 19 which in turn are applied to the amplifier RA causing the voice frequencies of the telephone current to be reproduced at the loud speaker 20. It will be understood, of course, that station S1 includes proper circuit switching apparatus so that its receiving apparatus is not effected by the telephone current sent out by the same station.

With switch SW set at its normal position and the train TV occupying the track FT in the position shown in Fig. 1, it is clear that the telephone current applied to the rails by one of the stations, say, for example, station S2 in the caboose, will flow in the rails past the track switch SW to the locomotive LC by being by-passed around the insulated rail joints 4 and 5 by the circuit completed at contact 12 of the switch circuit controller, and such communication current will be blocked from the rails of the track ST by the insulated rail joints 8 and 9. Likewise, telephone current transmitted from station S1 will be by-passed around the insulated rail joints 4 and 5 and will be blocked from flowing in the rails of the track ST by the insulated rail joints 8 and 9.

In the event the track switch SW is set at its reverse position so that the locomotive LC of train TV would occupy the track ST instead of track FT, the telephone current transmitted from the caboose station S2 is by-passed around the insulated rail joints 8 and 9 by the circuit completed by the contact 13 of the switch circuit controller and the telephone current is blocked from flowing in the rails of the track FT by the insulated rail joints 4 and 5.

Referring to Fig. 2, a turnout including a track switch SW connects a main track FT with a second track ST the same as in Fig. 1. In Fig. 2 the track rails of each of the two tracks FT and ST are formed into track circuited sections for signaling, only the one full section D—E which includes the turnout together with parts of the adjoining sections being shown for the sake of simplicity since these are sufficient for a full understanding of my invention. The limits of section D—E are defined by a pair of insulated rail joints 30 and 31 placed in rails 1a and 1b, respectively, to form the entrance end of the section and by a second pair of insulated rail joints 32 and 33 placed in the rails 1a and 1b, respectively, to define the exit end of the section, the insulated joints 32 and 33 being preferably located in the vicinity of the switch frog at about the fouling point between the two tracks FT and ST. Since the track switch SW is located in section D—E the switch rods of the switch points are insulated in the usual manner as indicated at 34. Also insulated rail joints 36 and 37 are located in the lead rails of the turnout, insulated rail joints 38 and 39 are placed in rails 1c and 1d of track ST in the vicinity of the switch frog at about the fouling point of the turnout and a cross bond 40 is connected between the two outside rails 1a and 1d so that the rails of the turnout are included in the track circuit of section D—E in the usual manner.

The track circuit of section D—E includes a source of current such as a battery 41 connected across the rails at the exit end of the section and a track relay TR connected across the rails at the entrance end of the section, the track relay TR being used to control any desired form of wayside signal not shown since such signal forms no part of my invention.

In a similar fashion the track circuit for the section of track FT next to the right of section D—E includes a track battery 45 connected across the rails adjacent location E. Also the track circuit for the section of track ST next to the right of section D—E includes a track battery 49 connected across the rails at the right-hand side of insulated rail joints 38 and 39.

To provide a circuit for by-passing communication current around insulated rail joints 32 and 33 and at the same time not interfere with the track circuits of the respective sections, I provide a circuit network controlled by circuit controller SC connected with the track switch SW the same as in Fig. 1. This circuit network involves a first path including wire 42 connected with rail 1a to the left of the insulated rail joint 32, a resistor R1, contact 12 of the switch circuit controller SC closed at the normal position of the track switch SW, a resistor R2 and wire 43 connected with rail 1a to the right of the insulated rail joint 32. This circuit network also includes another path that can be traced from rail 1b over wire 53 connected with rail 1b just to the left of insulated rail joint 33, a resistor R3, contact 12, a resistor R4 and wire 44 connected to rail 1b just to the right of insulated rail joint 33. It is clear that the rails 1a and 1b to the left of the insulated rail joints 32 and 33 are connected together through wire 42, resistors R1 and R3 in series and wire 53; and these rails are connected together to the right of the joints 32 and 33 over wire 43, resistors R2 and R4 in series and wire 44. The resistors R1 and R3 taken in series form a resistance sufficient to not seriously interfere with track circuit of section D—E. Likewise the resistors R2 and R4 taken in series form a resistance sufficient to not seriously interfere with the track circuit of the section next to the right of section D—E.

When the track switch SW is moved to its reverse position to set up the route to track ST the insulated rail joints 38 and 39 are bridged by a circuit network. Starting from rail 1d to the left of the insulated rail joint 39 a circuit path can be traced over cross bond 40, rail 1a, wire 42, resistor R1, wire 46, contact 13 of switch circuit controller SC closed at the reverse position of the track switch SW, a resistor R5 and wire 47 to rail 1d to the right of insulated rail joint 39. Also, starting from rail 1c to the left of insulated rail joint 38 a circuit path can be traced over rail 1c to the switch frog, back on rail 1b, wire 53, resistor R3, wire 46, contact 13, a resistor R6 and wire 48 to rail 1c to the right of the insulated rail joint 38.

Resistors R5 and R6 when taken in series form a circuit path across the rails 1c and 1d to the right of the insulated rail joints 38 and 39 and these two resistors in series form a resistance of sufficient magnitude to not seriously interfere with the track circuit of the associated track section.

In Fig. 2, a train TV provided with two telephone stations S1 and S2 is shown as moving on the track FT, the same as in Fig. 1. It is clear that telephone current supplied to the track rails 1a and 1b at station S2 is by-passed around the insulated rail joints 32 and 33 by the circuit network completed by contact 12 of the switch circuit controller and such communication current is available for effectively operating the receiving apparatus on the locomotive LC. Such telephone current is blocked from flowing in the rails of track ST because the circuit network provided for bridging around the insulated rail joints 38 and 39 is open at the contact 13 of the switch circuit controller. It is to be noted that in the circuit network which by-passes the telephone current around the insulated rail joints 32 and 33, the resistors R1 and R3 function in multiple and resistors R2 and R4 function in multiple because the mid terminal of resistors R1 and R3 is connected with the mid terminal of resistors R2 and R4. Likewise telephone current sent out by the station S1 flows in the rails 1b and 1a around the insulated rail joints 32 and 33 by this circuit network completed by contact 12 of the switch circuit controller.

In the event the track switch SW is set at its reverse position and the locomotive LC of train TV of Fig. 2 is operating on track ST, the telephone current supplied by either station S1 or S2 is by-passed around the insulated rail joints 38 and 39 by the circuit network completed by contact 13 of the switch circuit controller and such current is blocked from the rails of the track FT by the insulated rail joints 32 and 33. In this circuit network bridging rail joints 38 and 39 it is to be observed that the resistors R1 and R3 function in multiple and resistors R5 and R6 function in multiple because the contact 13 connects the mid terminal of resistors R1 and R3 with the mid terminal of resistors R5 and R6.

While in the form of the invention here disclosed resistors are used in the circuit network, it is clear that these resistors may be replaced by other impedance devices such as condensers if desired, such condensers being proportioned to pass the telephone current and to block the flow of the track circuit current.

Furthermore, while only a single turnout is illustrated other and more complicated track layouts comprising crossovers and other track switches may be provided in a similar manner with circuit networks for routing the communication current to the route set up by the track switches.

Although I have herein shown and described only two forms of apparatus for railway train communication systems embodying my invention, it is understood that various changes and modifications may be made therein within the scope of the appended claims without departing from the spirit and scope of my invention.

Having thus described my invention, what I claim is:

1. In a train communication system for communication between a station located on a vehicle of a train and a remote station by transmission of communication current between the two stations over a transmitting circuit including the track rails, the combination comprising, a turnout to at times route a train from a main track to a second track and at least the main track of which tracks is provided with a track circuit including the turnout, a switch circuit controller operatively connected with the track switch of said turnout for operation to a first or a second position according as said track switch is set for the main track or for said second track, a first pair of insulated rail joints placed in said main track with one joint in each rail back of the frog of said turnout to block the flow of said communication current, a second pair of insulated rail joints placed in said second track with one joint in each rail back of the frog of said turnout to block the flow of said communication current, a first and a second resistor connected in series across the rails to one side of said first pair of insulated rail joints, a third and a fourth resistor connected in series across the rails at the other side of said first pair of insulated rail joints, and a first position contact of said switch circuit controller to connect the mid terminal of said first and second resistors with the mid terminal of said third and fourth resistors to by-pass said communication current around said first pair of insulated rail joints when the track switch is set for the main track.

2. In a train communication system for communication between a station located on a vehicle of a train and a remote station by transmission of communication current between the two stations over a transmitting circuit including the track rails, the combination comprising, a turnout to at times route a train from a main track to a second track, a track circuited insulated track section including a portion of said main track and said turnout and having a first pair of insulated rail joints located in the rails of the main track at the fouling point of said tracks and a second pair of insulated rail joints located in the rails of the second track at the fouling point, a switch circuit controller operatively connected with the track switch of said turnout for operation to a first or a second position according as the track switch is set for the main track or for the second track, a first circuit network including a first position contact of said switch circuit controller and impedances, said first circuit network connected across the rails of the main track to each side of said first pair of insulated rail joints and arranged to by-pass said communication current around said first pair of insulated joints and to effectively block the flow of the track circuit current when the track switch is set for the main track, and a second circuit network including a second position contact of said switch circuit controller and impedances, and said second circuit network connected across the rails to each side of said second pair of insulated rail joints, and arranged to by-pass said communication current around said second pair of insulated rail joints and effectively block the flow of the track circuit current when the track switch is set for the second track.

3. In a train communication system for communication between a station located on a vehicle of a train and a remote station by transmission of communication current between the two stations over a transmitting circuit including the track rails, the combination comprising, a turnout to at times route a train from a main track to a second track, a track-circuited insulated track section including a portion of said main track and said turnout and having a first pair of insulated rail joints located in the rails of the main track at the fouling point of said tracks and a second pair of insulated rail joints located in the rails of the second track at the fouling point, a switch circuit controller operatively connected with the track switch of said turnout for operation to a first or a second position according as the track switch is set for the main track or for the second track, a first circuit network including a first position contact of said switch circuit controller and four resistances, said first circuit network arranged with two of its resistances connected in series across the rails adjacent one side of said first pair of insulated rail joints and its other two resistances connected in series across the rails adjacent the other side of said first pair of joints and its first position contact connecting the mid terminal of the first two mentioned resistances with the mid terminal of the last two mentioned resistances whereby said first circuit network is effective to by-pass said communication current around said first pair of insulated rail joints without interference to the track circuit when the track switch is set for the main track, and a second circuit network including a second position contact of said switch circuit controller and two resistances, and said second circuit network arranged with its resistances connected in series across the rail adjacent said second pair of insulated rail joints on the side remote from the track switch and its second position contact connected between the mid terminal of its two resistances and the mid terminal of the first two mentioned resistances of said first circuit network whereby said second circuit network is effective to by-pass said communication current around said second pair of insulated rail joints without interference to the track circuit when the track switch is set for the second track.

GEORGE R. PFLASTERER.